Oct. 8, 1946.　　　　P. DE ASIS　　　　2,408,740
ANIMAL TRAP
Filed June 8, 1944　　　3 Sheets-Sheet 1
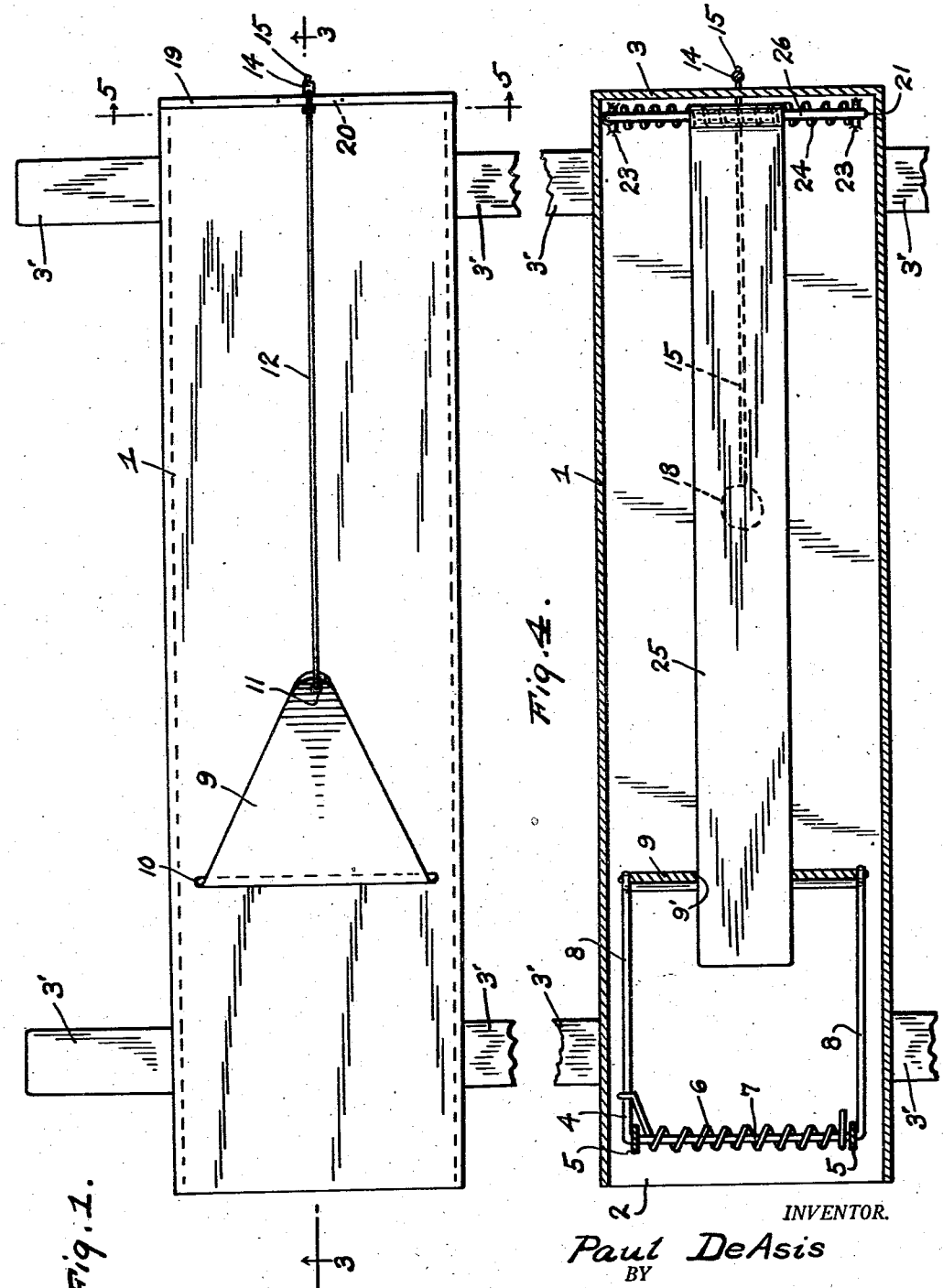
INVENTOR.
Paul DeAsis
BY
Victor J. Evans & Co.
ATTORNEYS

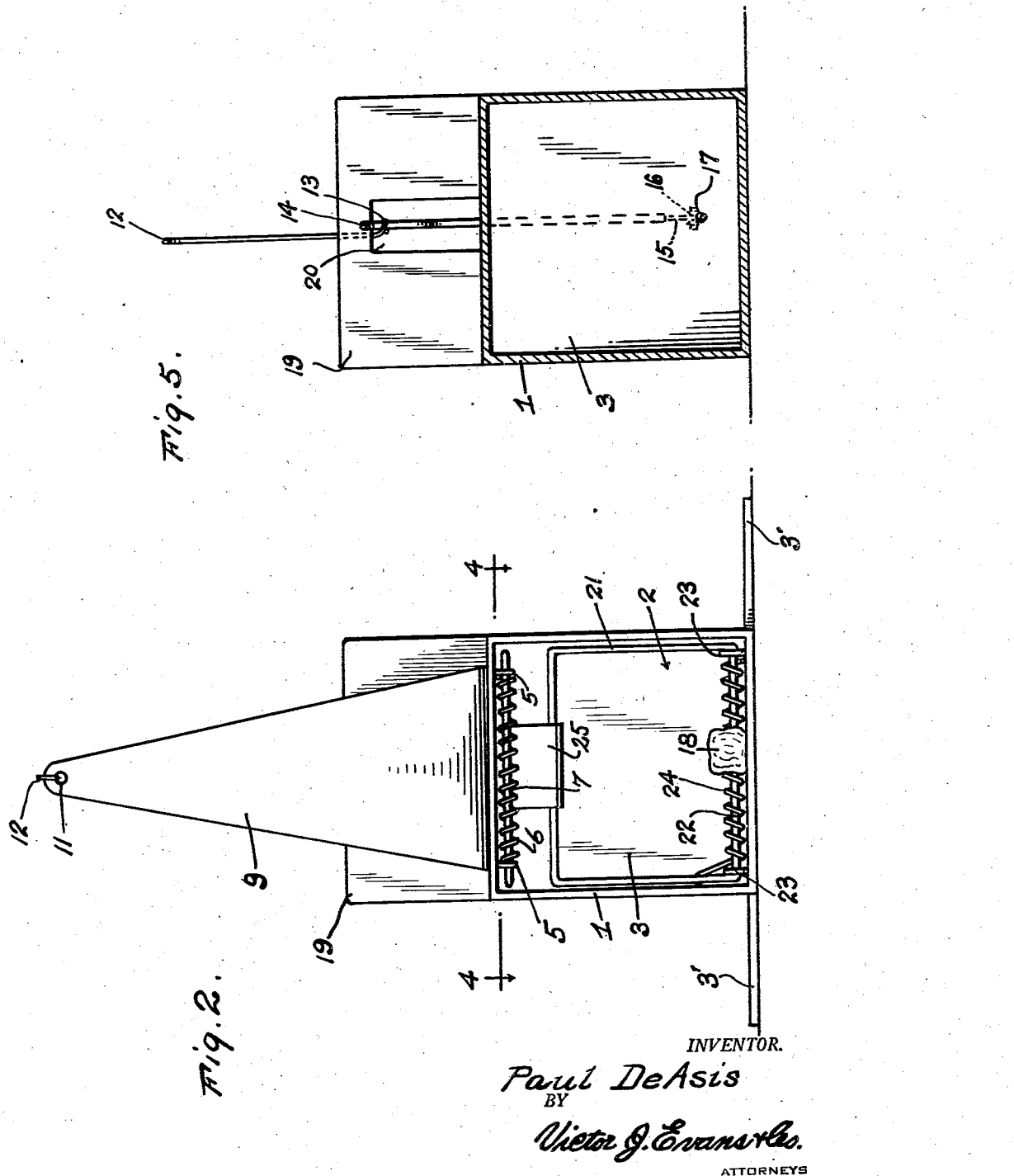

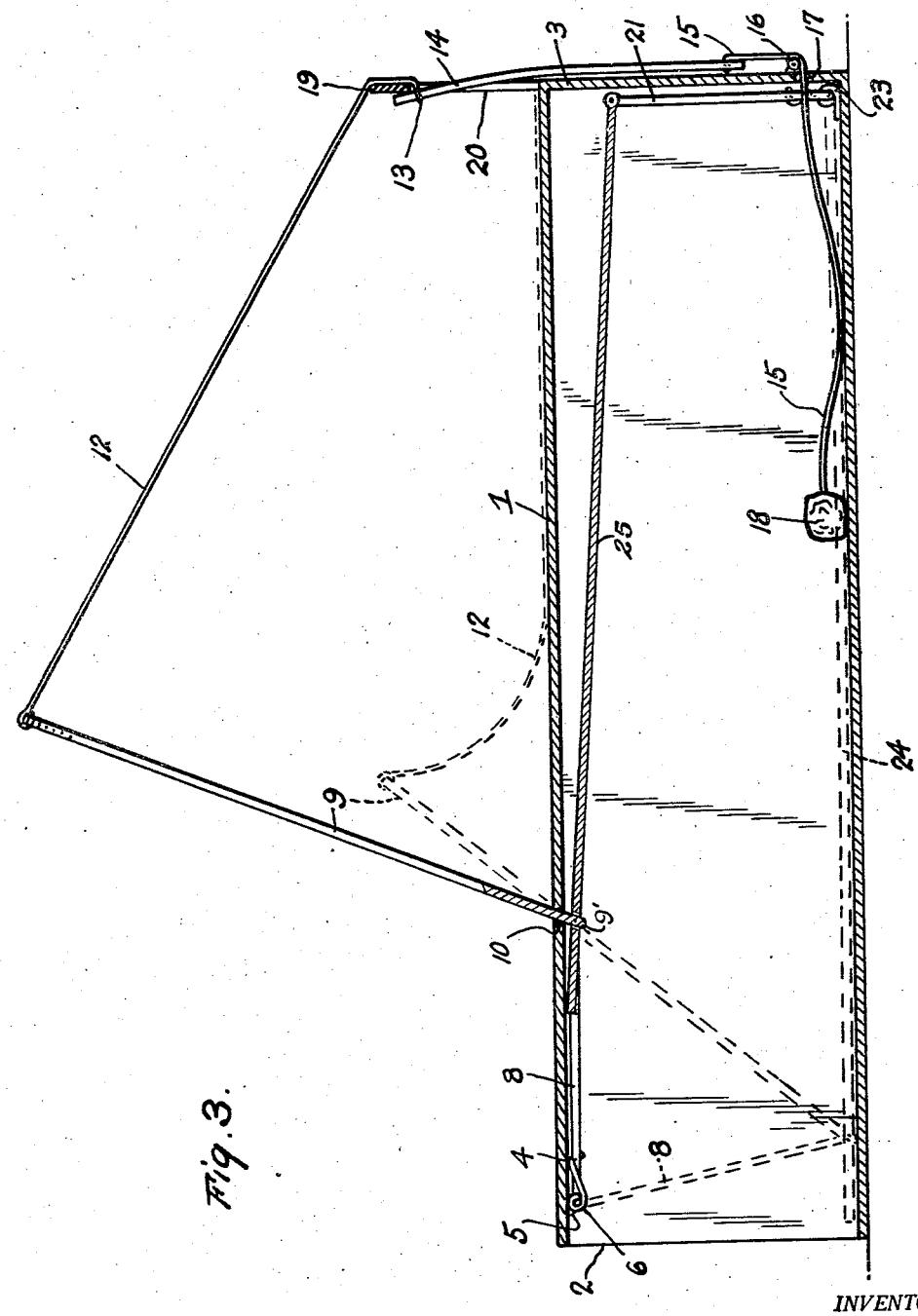

Patented Oct. 8, 1946

2,408,740

UNITED STATES PATENT OFFICE 2,408,740

ANIMAL TRAP

Paul De Asis, New York, N. Y.

Application June 8, 1944, Serial No. 539,309

8 Claims. (Cl. 43—61)

This invention relates to traps and more particularly to a trap for catching animals, it being one object of the invention to provide a trap of such construction that the mechanism for catching and killing an animal is enclosed within a housing where it is a closure for the open end of the housing as well as serving as means for striking and killing the animal. It will thus be seen that since the striking and catching mechanism is enclosed within the housing, a person will not be liable to have his hand caught and injured when setting the trap and the animal will be prevented from escaping if not killed by the striker and also other animals will be prevented from entering the sprung trap and damaging the caught animal.

Another object of the invention is to provide a trap wherein the setting mechanism is located externally of the housing where it may be easily set, and a keeper constituting part of the setting mechanism is connected by a string with a bait holder inside the housing in order that an animal may release the closure and the striker after fully entering the housing.

Another object of the invention is to so mount the closure and the striker that they may move together and thus insure confinement of the animal within the housing in case it should not be killed or securely held by the striker.

Another object of the invention is to provide a trap which is simple in construction, cheap to manufacture, and very efficient in operation.

The invention is illustrated in the accompanying drawings wherein—

Figure 1 is a top plan view of the improved trap.

Figure 2 is a view looking at the front end of the trap.

Figure 3 is a longitudinal sectional view taken along line 3—3 of Figure 1.

Figure 4 is a longitudinal sectional view taken longitudinally of the trap along the line 4—4 of Figure 2.

Figure 5 is a sectional view taken transversely through the trap along line 5—5 of Figure 1.

This improved trap has a housing 1 which may be formed of metal or other suitable material and is preferably of greater length than width, as shown in the drawings, but may be of any suitable dimensions. The housing is open at its front end to provide an inlet 2 and at its back has a rear wall 3 so that when the entrance is closed, an animal within the trap will be confined therein and prevented from escaping if not killed. Legs 3' project from and are welded to the opposite sides of the housing at its bottom and since the legs are located adjacent front and rear ends of the housing, the housing will be braced and prevented from tilting transversely and falling over.

A U-shaped yoke 4 is located within the front end portion of the housing and is pivotally mounted by bearing members 5 carried by the top wall of the housing. A helical spring 6 is coiled about the bridge portion 7 of the yoke 4 with one end abutting the top of the housing and its other end engaging the adjacent one of the arms 8 of the yoke to urge the yoke downwardly to the position indicated by dotted lines in Figure 3 when the trap is sprung after being set. The inner or lower ends of the arms 8 of the yoke are pivoted to opposite sides of the upright member 9 which extends upwardly through a slot 10 in the top wall of the housing. This upright member is reduced in width towards its upper end and at its tip is formed with an opening 11 through which is secured one end of a string or wire 12. This string extends towards the rear end of the housing and at its rear end is formed with an eye or loop 13 in order that the string may be releasably engaged with a rod or keeper 14. This rod 14 has one end formed with an opening through which an end of a wire 15 is secured, and referring to Figure 3, it will be seen that the wire 15 is engaged with a roller or equivalent rotatable guide 16 and passed inwardly through an opening 17 midway the width of the lower end of the rear wall 3 of the housing. The wire 15 extends into the rear portion of the housing an appreciable distance and at its inner end carries bait 18 which is of such a nature that it will be attractive to the animal to be caught and is so applied to the inner end of the wire that it will not come loose when subjected to pull by an animal attempting to take the bait. A panel 19 extends upwardly across the rear end of the housing and midway its width is formed with a vertically extending opening 20 through which the upper end of the rod 14 is passed after being engaged through the eye 13 and since the upper end of the rod bears against the front face of the panel above the top of the opening 20 pull exerted upon the string 12 by action of the spring 6 will cause the rod to be frictionally held against downward movement and the rod and string will be held in engagement with each other and the yoke 4 will be held in its raised position and the upright member or plate 9 also held raised. An animal may then freely enter the housing through the open front end thereof to take the bait and exert pull upon the bait and the wire 15 to draw the rod 14 downwardly and out of engagement with the string 12. The spring 6 will then swing the yoke 8 downwardly and draw the plate 9 downwardly into position for blocking the open front end of the housing.

A striker 21 is disposed within the housing at the rear end thereof. This striker is formed of stiff wire or equivalent material and its lower cross bar 22 is rotatably mounted in bearing members 23 and carries a helical spring 24 of less strength than spring 6 and having an arm at one end bearing against the floor or bottom of the housing and the arm at its other end engaging a side arm of the striker so that the striker will be urged downwardly to a lowered position. A wooden strip 25 extends longitudinally in the housing with its rear end pivotally connected with the upper cross bar 26 of the striker and its forward end portion pivotally mounted through a transverse slot 9' formed in the lower end of the plate 9. The striker will thus be connected with the plate by the strip 25 and when the yoke 4 is swung downwardly by the spring 6 and the plate drawn downwardly the strip 25 and the striker will be moved downwardly and an animal in the housing struck a violent blow as well as being caught between the striker and the strip and the bottom of the housing. If the animal is not killed by the blow and squirms loose, it will be confined in the housing by the lowered plate 9 and prevented from escaping. The lowered plate also serves to prevent other animals from entering the sprung trap and tearing the fur of the entrapped animal if the trap is used for catching fur-bearing animals. Since the setting mechanism is located externally of the housing and the striker and the strip 24 are within the housing, the trap may be set without danger of a person catching his hands in the trap and sustaining injuries.

What is claimed is:

1. A trap comprising a housing open at its front end and having a top formed with a transverse slot spaced from its front end and a rear end wall formed with an opening near its lower end, a striker pivotally mounted in the rear portion of said housing and urged downwardly, a yoke pivotally mounted adjacent the open front end of said housing and urged downwardly, a plate pivoted to the inner rear end of said yoke and extending upwardly through the slot in the top of the housing, a strip extending longitudinally in said housing and having its rear end pivoted to the upper end of said striker and its front end pivoted to the lower end of said plate, a panel extending upwardly across the rear end of said housing and formed with a vertically extending opening intermediate its width, a bait-holding line passing through the opening in the rear wall of said housing with its inner portion extending longitudinally in the housing for carrying bait, a rod carried by the rear end of said line and disposed vertically in set position with its upper end portion passing through the opening of the panel and bearing against the front face of the panel above the opening thereof, and a line secured at the upper end of said plate and extending rearwardly of the housing with its rear end passing downwardly and forwardly through the opening of the panel and terminating in an eye for engaging about the upper portion of said rod.

2. A trap comprising a housing open at its front end, a yoke in said housing and pivoted to the top thereof adjacent the open end of the housing, a spring urging said yoke downwardly, a plate pivoted to the inner rear end of said yoke and extending upwardly through the top of the housing, said plate when moved downwardly with said yoke constituting a barrier for the front end of the housing, a striker in the rear end of said housing pivoted at its lower end to the bottom of the housing, a spring of less strength than the first spring urging the striker downwardly, an abutment over the rear end of said housing, a line carried by the upper end of said plate and having an eye at its free end, said line being of a length adapting it to extend rearwardly with its free end extending downwardly back of the abutment and its eye passed forwardly through the abutment, a bait holding line in said housing passed outwardly through the rear end wall of the housing, a rod secured at one end to the outer end of the bait-holding line and of a length adapting it to be disposed vertically against the rear wall of the housing with its upper end engaged through the eye of the first line and bearing against the front face of the abutment to releasably hold the plate and the yoke raised, and a member extending longitudinally in the housing and pivoted to the upper end of the striker and the lower end of the plate to cause simultaneous movement of the striker and the plate.

3. A trap comprising a housing open at its front end and having a rear wall closing its rear end, a yoke in the forward portion of said housing pivoted at its upper end to the top of the housing for swinging movement from a lowered position to a raised position against the top of the housing, a plate extending upwardly through the top of the housing and having its lower end pivoted to the lower end of the yoke, a panel rising from the rear end of said housing and formed with an opening, a line secured at one end to the upper end of said plate and having an eye at its free end, the cord being of a length adapting it to extend rearwardly from the raised plate with its rear end passed downwardly back of the panel and forwardly through the opening of the panel, a bait-holding line in said housing extending outwardly through the rear wall, and a rod carried by the outer end of the bait-holding line and of a length adapting it to be disposed vertically against the rear wall with its upper end passed through the opening of the panel and engaged through the eye of the first line to releasably hold the plate raised.

4. A trap comprising a housing open at its front end and having a rear wall closing its rear end, a yoke in the forward portion of said housing pivoted at its upper end to the top of the housing for swinging movement from a lowered position to a raised position against the top of the housing, a plate extending upwardly through the top of the housing and having its lower end pivoted to the lower end of the yoke, a line attached at one end to the upper end of said plate and having an eye at its free end, a bait-holding line in said housing extending outwardly through the rear wall of the housing, and a keeper carried by the outer end of the bait-holding line for disposition against the rear wall with a portion engaged through the eye of the first line to releasably hold the plate raised.

5. A trap comprising a housing open at its front end and having a rear wall closing its rear end, a yoke in the forward portion of said housing pivoted at its upper end to the top of the housing for swinging movement from a lowered position to a raised position against the top of the housing, a plate extending upwardly through the top of the housing and having its lower end pivoted to the lower end of the yoke, a line attached at one end to the upper end of said plate and having an eye at its free end, a bait-holding line in said housing extending outwardly through the rear wall of the housing, a keeper carried by the outer end of said bait-holding line for engaging through the eye of the first line and releasably holding the plate raised, a striker in said housing mounted for vertical swinging movement, and a connection between the striker and the plate for causing simultaneous movement thereof.

6. A trap comprising a housing open at its front end and having a rear wall closing its rear end, a yoke in the forward portion of said housing pivoted at its upper end to the top of the housing for swinging movement from a lowered position to a raised position against the top of the housing, a plate extending upwardly through the top of the housing and having its lower end pivoted to the lower end of the yoke, a retainer carried by the upper end of said plate for extending rearwardly of the housing, a bait holder in said housing extending outwardly through the rear wall thereof, a keeper connected to the outer end of the bait-holder and engaging said retainer and releasably holding the plate raised, a striker in said housing mounted for vertical swinging movement, and a connection between the striker and the lower end of the plate for causing simultaneous movement thereof.

7. A trap comprising a housing open at its front end and having a rear wall closing its rear end, a yoke in the forward portion of said housing pivoted at its upper end to the top of the housing for swinging movement from a lowered position to a raised position against the top of the housing, a plate extending upwardly through the top of the housing and having its lower end pivoted to the lower end of the yoke, a retainer carried by the upper end of said plate for extending rearwardly of the housing, a bait-holding line in said housing extending outwardly from the rear end thereof, and a rod connected with the outer end of the bait-holding line for engaging the retainer and releasably holding the plate raised.

8. A trap comprising a housing open at its front end and having a rear wall closing its rear end, a yoke in the forward portion of said housing pivoted at its upper end to the top of the housing for swinging movement from a lowered position to a raised position against the top of the housing, a plate extending upwardly through the top of the housing and having its lower end pivoted to the lower end of the yoke, a retainer carried by the upper end of said plate for extending rearwardly of the housing, a bait-holder in said housing, a keeper for engaging said retainer and releasably holding the plate raised, said keeper being moved out of engagement with the retainer by the bait-holder, and a striker in said housing connected with the plate for simultaneous movement therewith.

PAUL DE ASIS.